(12) United States Patent
Mohageg

(10) Patent No.: US 10,066,994 B2
(45) Date of Patent: Sep. 4, 2018

(54) PYRAMIDAL SPACER FOR INCREASED STABILITY FABRY PEROT RESONATOR

(71) Applicant: RAYTHEON COMPANY, Waltham, MA (US)

(72) Inventor: Makan Mohageg, Granada Hills, CA (US)

(73) Assignee: RAYTHEON COMPANY, Waltham, MA (US)

( * ) Notice: Subject to any disclaimer, the term of this patent is extended or adjusted under 35 U.S.C. 154(b) by 641 days.

(21) Appl. No.: 14/575,356

(22) Filed: Dec. 18, 2014

(65) Prior Publication Data

US 2016/0178436 A1 Jun. 23, 2016

(51) Int. Cl.
| | |
|---|---|
| *G01J 3/26* | (2006.01) |
| *G01J 3/02* | (2006.01) |
| *G02F 1/21* | (2006.01) |
| *G02B 5/28* | (2006.01) |
| *G02B 7/00* | (2006.01) |

(52) U.S. Cl.
CPC ............... *G01J 3/26* (2013.01); *G01J 3/021* (2013.01); *G02B 5/284* (2013.01); *G02B 7/008* (2013.01); *G02F 1/21* (2013.01); *G02F 2001/213* (2013.01)

(58) Field of Classification Search
CPC .. G01J 3/26; G01J 3/021; G02B 5/284; G02B 7/008; G02F 1/21; G02F 2001/213
See application file for complete search history.

(56) References Cited

U.S. PATENT DOCUMENTS

2013/0229713 A1* 9/2013 Webster ............... G02B 26/001
359/578

FOREIGN PATENT DOCUMENTS

WO 2012063033 A2 5/2012

OTHER PUBLICATIONS

Didier, et al., "Ultra Compact Reference ULE Cavity", European Frequency and Time Forum, Jun. 26, 2014, pp. 514-517.
Leibrandt, et al., "Spherical Reference Cavities for Frequency Stabilization of Lasers in Non-Laboratory Environments", Optics Express, vol. 19, Issue 4, pp. 3471-3482, (2011).
Legero, et al., "Tuning the Thermal Expansion Properties of Optical Reference Cavities With Fused Silica Mirrors", Journal of the Optical Society of America B, vol. 27, Issue 5, pp. 914-919, (2010), (Abstract Only).
Numata et al., "Thermal-Noise Limit in the Frequency Stabilization of Lasers With Rigid Cavities", Phys. Rev. Lett. 93, 250602, Dec. 17, 2004, (Abstract Only).

* cited by examiner

*Primary Examiner* — Georgia Y Epps
*Assistant Examiner* — Don Williams
(74) *Attorney, Agent, or Firm* — Lando & Anastasi, LLP

(57) ABSTRACT

A Fabry Perot resonator spacer is provided. The Fabry Perot resonator spaced includes a tetrahedral body, the tetrahedral body being made of a material having a Poisson ratio and defining a plurality of triangular faces, a plurality of edges, and a plurality of corners, wherein each one of the plurality of corners is truncated to form a mounting surface in a mounting plane. The spacer further includes a first mirror channel configured to receive a first optical element, a second mirror channel configured to receive a second optical element, and an optical cavity extending linearly through the tetrahedral body between the first mirror channel and the second mirror channel.

15 Claims, 5 Drawing Sheets

PYRAMIDAL SPACER FOR INCREASED STABILITY FABRY PEROT RESONATOR

BACKGROUND

Fabry-Perot resonators have a wide variety of applications throughout scientific, industrial, medical, and military fields. For instance, such applications can include telecommunications networks, laser resonators, and laser spectroscopy, as well as other airborne sensing applications. Common Fabry-Perot resonators include two optical plates or mirrors spaced a distance apart. The distance between optical plates may be an air gap, or may be filled with other material. The optical plates are arranged in such a way that an input light wave entering the pair of plates is reflected multiple times between the plates, thereby generating multiple output waves. By adjusting the space between the two optical plates it is possible to control the resonant wavelengths of the resonator.

SUMMARY OF INVENTION

Aspects and embodiments are directed to Fabry-Perot resonators. In particular, embodiments include resonator systems and resonator spacers insensitive to deforming forces. Accordingly, one embodiment includes a resilient tetrahedral shaped Fabry-Perot spacer having characteristics of a spherical and cubic spacer. Reduced mass as well reduced symmetry of the spacer, due to the tetrahedral shape of the spacer, increases insensitivity to acceleration, vibration, and thermal forces across the frequency spectrum critical to airborne applications. In at least one embodiment, truncated corners and/or edges of the spacer further reduce the mass and the symmetry of the spacer, additionally increasing insensitivity of the resonator to disruptive forces. In other embodiments, the use of thermal stability rings protects externally facing surfaces of optical elements in the Fabry-Perot resonator, increasing insensitivity to thermal forces and fluctuations. Increased force insensitivity allows for deployment of Fabry-Perot resonators on moving platforms.

At least one aspect described herein is directed to a Fabry Perot resonator spacer, comprising a tetrahedral body, the tetrahedral body being made of a material having a Poisson ratio and defining a plurality of triangular faces, a plurality of edges, and a plurality of corners, wherein each one of the plurality of corners is truncated to form a mounting surface in a mounting plane, a first mirror channel configured to receive a first optical element, a second mirror channel configured to receive a second optical element, and an optical cavity extending linearly through the tetrahedral body between the first mirror channel and the second mirror channel.

According to one embodiment, each one of the plurality of edges is truncated at a pre-determined angle relative to one of the mounting planes. In one embodiment, each one of the plurality of edges is truncated according to: $\varphi=\tan^{-1}(1-\upsilon)$, where $\varphi$ is the angle relative to one of the mounting planes and $\upsilon$ is the Poisson ratio of the material of the tetrahedral body. In another embodiment, the first mirror channel and the second mirror channel are disposed on distal truncated edges of the tetrahedral body.

According to another embodiment, the first mirror channel and the second mirror channel are disposed on distal truncated edges of the tetrahedral body. In one embodiment, the Fabry Perot resonator spacer further comprises a first optical element disposed in the first mirror channel and a second optical element disposed in the second mirror channel. In one embodiment, the first optical element includes a first curved mirror and the second optical element includes a second curved mirror. In another embodiment, the first optical element further includes a first thermal stability ring and the second optical element further includes a second thermal stability ring, the first and the second thermal stability ring configured to shield the first and second optical elements from temperature variations.

According to one embodiment, the Fabry Perot resonator spacer further comprises a first and a second bore, the first and the second bore extending orthogonally through the tetrahedral body relative to each other and the optical cavity. In one embodiment, the first and the second bore are cylindrical. In another embodiment, the optical cavity has a length of one inch. In another embodiment, the tetrahedral body is composed of one of ultra low expansion glass, single crystal silicon, carbon fiber materials, material having a negative coefficient of thermal expansion, silicon carbide, crystalline silicon carbide, sapphire, quartz, electro-optical material, piezo-electric material, and ceramic material.

Another aspect described herein is directed to a Fabry Perot resonator system comprising a spacer having a tetrahedral body, the tetrahedral body being made of a material having a Poisson ratio and defining a plurality of edges and a plurality of corners, a first optical element and a second optical element spaced apart by the tetrahedral body, and an optical cavity extending linearly through the tetrahedral body between the first optical element and the second optical element.

According to one embodiment, each one of the plurality of corners is truncated to form a mounting surface in a mounting plane. In one embodiment, each one of the plurality of edges is truncated at a pre-determined angle relative to one of the mounting planes. In one embodiment, each one of the plurality of edges is truncated according to: $\varphi=\tan^{-1}(1-\upsilon)$ where $\varphi$ is the angle relative to the mounting plane and $\upsilon$ is the Poisson ratio of the material of the tetrahedral body.

According to another embodiment, the first optical element and the second optical element are disposed on distal truncated edges of the tetrahedral body. In one embodiment, the first optical element includes a first curved mirror and the second optical element includes a second curved mirror. In another embodiment, the first optical element further includes a first thermal stability ring and the second optical element further includes a second thermal stability ring, the first and the second thermal stability ring configured to shield the first and second optical elements from temperature variations.

According to one embodiment, the Fabry Perot resonator system further comprises a first and a second bore, the first and the second bore extending orthogonally through the tetrahedral body relative to each other and the optical cavity. In one embodiment, the optical cavity has a length of one inch.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Figure 1:
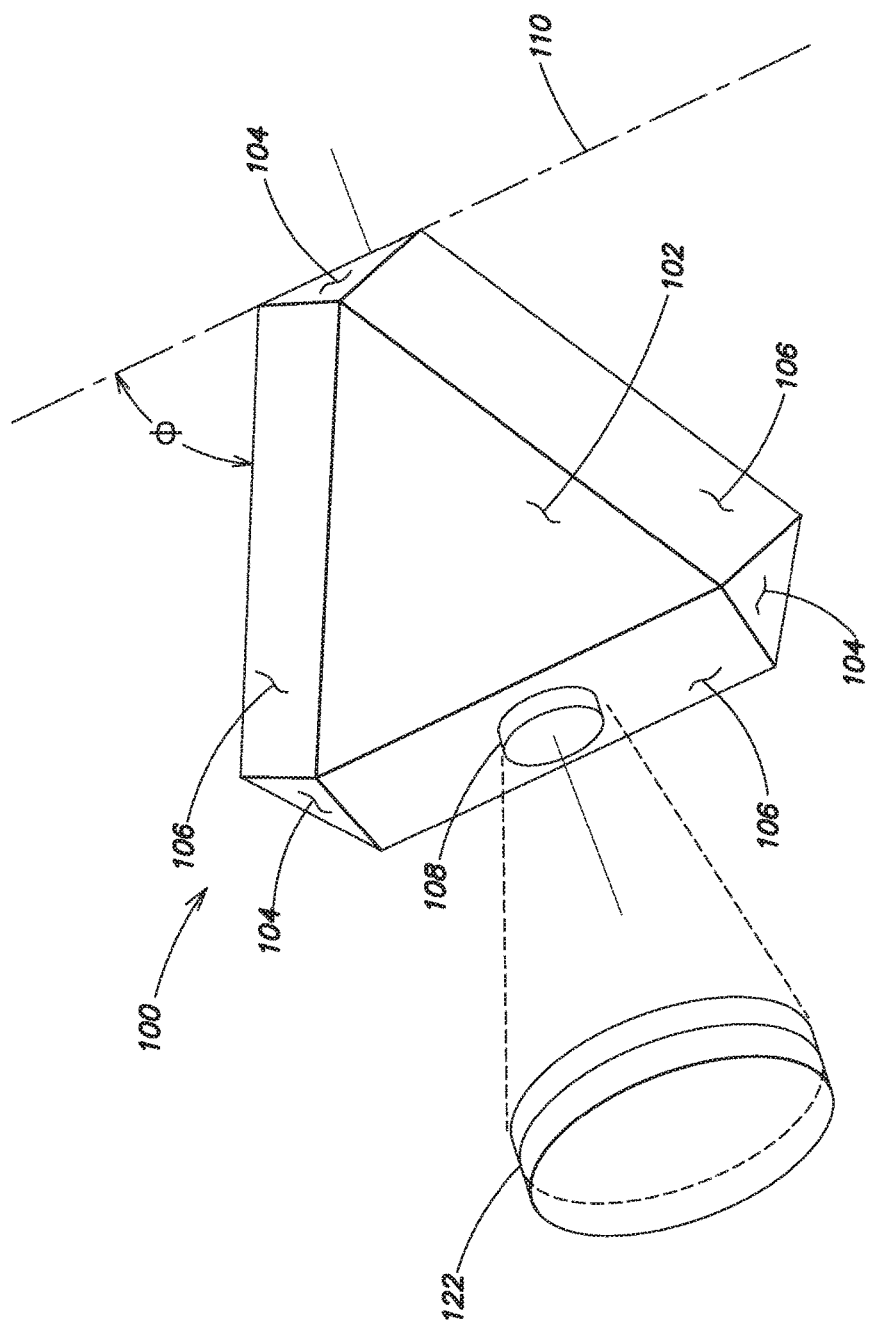
FIG. 1 is a perspective view of a Fabry-Perot resonator spacer according to an embodiment.

As discussed above, conventional Fabry-Perot resonators include two reflective optical elements spaced apart at a precise distance. The distance may be an air gap, may be filled with other material, or defined by a resonator spacer. It is typically desirable for the structure of a Fabry-Perot resonator to withstand forces on the structure caused by motional acceleration, harmonic motion, temperature, and/or mounting hardware as such forces can cause changes in the geometry of the pair of optical elements. For example, motional acceleration of the resonator can cause a change in the gap between the elements, which can result in undesirable effects for the resonator, such as the generation of inaccurate signals.

Early Fabry-Perot resonators consisted of two optical elements spaced apart by a solid glass spacer. Later, the solid glass spacer was replaced with a hollow glass tube. Hollow glass tubes enabled the light waves reflecting between the pair of optical elements to travel in the air between the optical elements. However, both of these methods were susceptible to undesirable effects created by external forces such as motional acceleration. Traditional methods for increasing Fabry-Perot resonator stability include the use of resonator spacers shaped in the manner of a "football," and a two point mounted sphere. While slightly improving the insensitivity of a Fabry-Perot resonator to external thermal forces, the "football" shaped spacer and the two point mounted sphere spacer are impractical to mount and are still susceptible to accelerational forces. Additional attempts to improve the insensitivity of a Fabry-Perot resonator, such as with a cubic shaped spacer, suffer from related deficiencies.

Accordingly, a resonator system and a conveniently mountable spacer, which are insensitive to deforming forces, are provided. In one embodiment, the resonator system includes a resilient tetrahedral shaped Fabry-Perot spacer having the desirable characteristics of a spherical and cubic spacer that is compatible with ring compensators. Reduced mass as well as reduced symmetry of the tetrahedral shaped spacer increases insensitivity to acceleration, vibration, and thermal forces across the frequency spectrum critical to airborne applications.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Referring to FIG. 1, a Fabry-Perot spacer generally indicated at 100 having a tetrahedral shape insensitive to deformational forces such as motional acceleration, harmonic motion, temperature, and/or forces caused by mounting hardware, is shown. The spacer 100 defines a plurality of triangular faces each indicated at 102, a plurality of corners each indicated at 104, and a plurality of edges each indicated at 106. Triangular faces 102 obscured by the spacer 100 in FIG. 1 are shown in the cross-sectional view of FIG. 3. In particular, the Fabry-Perot spacer 100 is comprised of four triangular faces 102, four corners 104, and six edges 106. As shown in FIG. 1, the plurality of triangular faces 102 can be shaped to form flat surfaces.

By utilizing a tetrahedral shape, which has a reduced mass when compared with other shaped spacers (e.g., a cube shaped spacer), the mechanical resonance frequency of the Fabry-Perot spacer 100 is increased, making the spacer 100 largely force insensitive. For example, in one embodiment, a nominally 2" cube is reduced by approximately 0.75" at each of the plurality of triangular faces 102. The same scale applies for a 1" cube. In various embodiments, the spacer 100 is composed of any material known in the art substantially resistant to elastic deformation. For example, the spacer 100 may be composed of ultra low expansion glass, Corning® ULE offered by Corning, Inc. of Corning, N.Y., single crystal silicon, ZERODUR® spacer material offered by Schott AG of Mainz, Germany, carbon fiber materials, material having a negative coefficient of thermal expansion, silicon carbide, crystalline silicon carbide, sapphire, quartz, electro-optical material, piezo-electric material, or ceramic material.

In an additional embodiment, the corners 104 of the spacer 100 are truncated to form a plurality of mounting surfaces 104. According to various embodiments, the corners 104 are truncated in a planar manner to form flat surfaces ideal for restraining the Fabry-Perot spacer 100 (e.g., the mounting plane of a truncated corner (i.e., mounting surface 104) is shown as dotted line 110 in FIG. 1). The mounting surfaces 104 can be configured to receive a mounting apparatus (not shown). The mounting apparatus can include a four point mount system, in which each point is configured to make contact with a mounting surface 104 and apply a compressive force toward the center of the spacer 100 to restrain the spacer 100. A four point mounting system prevents rotation of the spacer 100, while applying minimal contact pressure that could result in unwanted elastic deformation. Other embodiments of the mounting apparatus may include any number of mounting interfaces, such as a two or three point mounting system. Furthermore, in various embodiments, the mounting apparatus can include any restraining system known in the art to effectively hold a Fabry-Perot spacer. For example, each point of the four point mounting system can include a holding sphere configured to make contact with a mounting surface 104 of the Fabry-Perot spacer 100 and direct a compressive force towards the center of the spacer 100. In another embodiment, the restraining system of the mounting apparatus can include posts or brackets.

In another embodiment, the edges 106 of the Fabry-Perot spacer 100 are truncated. In particular, the six edges 106 of the Fabry-Perot spacer 100 may each be truncated at a pre-determined angle to form six planar surfaces. In one embodiment, each edge 106 is truncated at a pre-determined angle (shown as φ) from the plane 110 of a corresponding mounting surface 104. As discussed above, the tetrahedral shape of the spacer 100 offers improved insensitivity as a result of at least reduced mass and reduced symmetry. Truncated corners 104 and/or edges 106 further reduce the mass and the symmetry of the spacer 100, additionally increasing insensitivity of the resonator to disruptive forces.

In one embodiment, the optimal mounting angle (φ) at which each edge 106 of the Fabry-Perot spacer 100 is truncated (for a four point mounting system) to achieve desirable insensitivity to external forces is determined by combining the desirable qualities of a spherical Fabry-Perot spacer, with the desirable qualities of a cubic Fabry-Perot spacer. For example, equation (1) shows the optimal mounting angle for a two point mount (e.g., utilized with a spherical spacer). In a typical two point mount, force is applied to the spherical spacer from opposite directions. As used herein, the mounting angle, $\varphi_s$, refers to the angle between the body of the spherical spacer and the mounting surface.

$$\varphi_s = \tan^{-1}\left(\frac{1}{1-\upsilon}\right) \quad (1)$$

Equation (1) is derived from a two point spherical mount, where $\upsilon$ is the Poisson ratio of the spacer material. As shown, the mounting angle ($\varphi_s$) varies depending on the Poisson ratio of the spacer material. From this equation, an equation for the optimal mounting angle for a four point system can be reached. As shown in equation 2, for an n-point mount, where n is the number of mounts, a summation of the forces for the n-point mount ($F_n$) should equal the forces in a two point mount system (F).

$$\sum_{n=1}^{N} F_n = F \quad (2)$$

Figure 2:
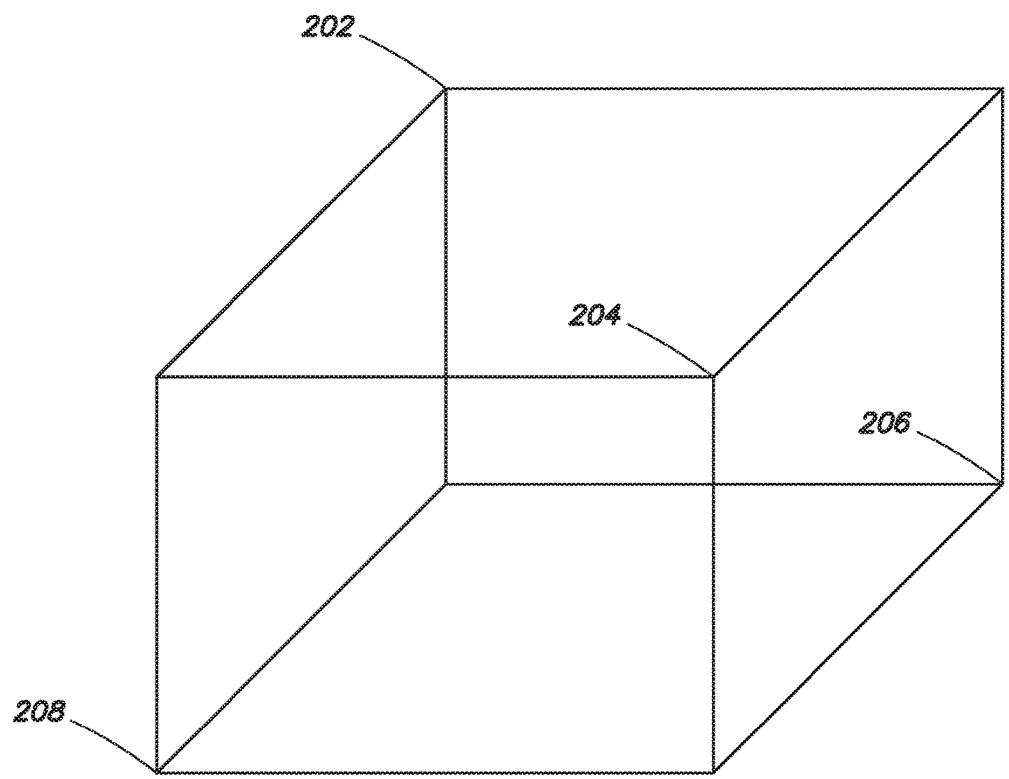
FIG. 2 is a demonstrative four point Fabry-Perot resonator spacer mounting system.
Figure 2:
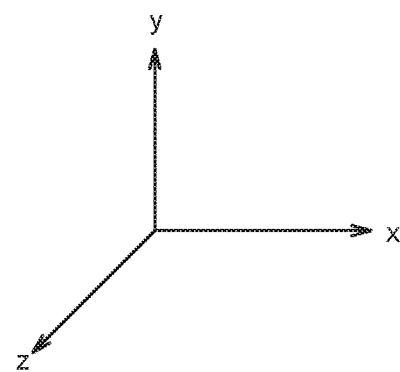

Applying this equation to a four point mount system in which the points are distributed as shown in FIG. 2 (mount point one 202, mount point two 204, mount point three 206, and mount point four 208), the distribution of forces in the x, y, and z direction of a Cartesian coordinate system will be expressed as equations (3)-(5). It should be noted that a cubic shape is illustrated in FIG. 2 for demonstrative purposes only, and is not intended to be limiting.

$$\sum_{n=1}^{4} F_{xn} = \cos(\varphi_s) \quad (3)$$

$$\sum_{n=1}^{4} F_{yn} = \sin(\varphi_s) \quad (4)$$

$$\sum_{n=1}^{4} F_{zn} = 0 \quad (5)$$

Using trigonometry identities and equations (3)-(5), in addition to the optimal mounting angle equation of a two point mounting system (i.e., equation (1)), mounting equations (6) and (7) can be derived for a four point mounting system, where $\varphi_1$ is the mounting angle at mount point one 202, $\varphi_2$ is the mount angle at mount point two 204, $\varphi_3$ is the mount angle at mount point three 206, and $\varphi_4$ is the mount angle at mount point four 208.

$$\tan\left(\frac{\varphi_1 + \varphi_3}{2}\right) = 1 - \upsilon \quad (6)$$

$$-\tan\left(\frac{\varphi_2 + \varphi_4}{2}\right) = 1 - \upsilon \quad (7)$$

Therefore, in an embodiment for a four point mounting system, $\varphi_1=\tan^{-1}(1-\upsilon)$, $\varphi_3=\varphi_1$, and $\varphi_2=\varphi_4=\varphi_1+\pi$. As discussed herein, the mounting angles are relative to the plane of a corresponding mounting surface. Truncating the edges 106 of the Fabry-Perot spacer 100 according to angles $\varphi_1$-$\varphi_4$ results in a tetrahedral shape with substantially improved proportions. Along with the inherent force insensitive nature of the tetrahedral shape due to reduced mass and symmetry, application of angles $\varphi_1$-$\varphi_4$ can additionally increase the force insensitivity of the Fabry-Perot spacer 100 by further reducing mass and symmetry. Therefore, further embodiments include truncating the edges 106 of the tetrahedral spacer 100 according to $\varphi=\tan^{-1}(1-\upsilon)$, where $\varphi$ is the angle relative to the plane of a corresponding mounting surface.

Figure 3:
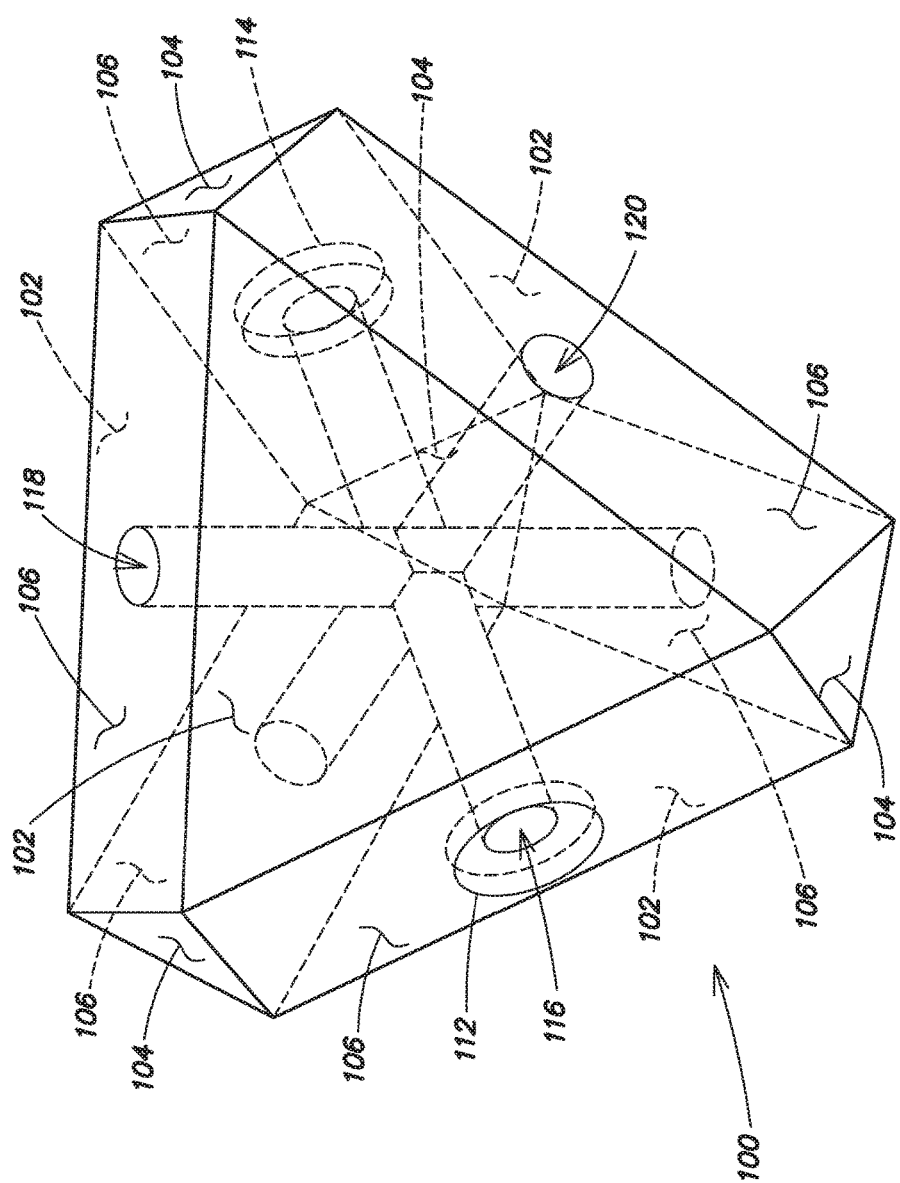
FIG. 3 is a cross-sectional perspective view of a Fabry-Perot resonator spacer according to an embodiment.

Referring now to FIG. 3, with continuing reference to FIG. 1, the spacer 100 can further include a first mirror channel 112 configured to receive a first optical element 108 (shown in FIG. 1) and a second mirror channel 114 configured to receive a second optical element (obscured by the spacer 100 in FIG. 1). In various embodiments, the first and the second optical elements can include a curved mirror 122 (shown in an expanded view of first optical element 108). In further embodiments, the curved mirror 122 can be spherically or aspherically curved.

An input light wave entering the first mirror 108 is reflected between the first mirror 108 and second mirror multiple times. Each time the input light wave reflects off of the second mirror, a portion is reflected back towards the first mirror 108 and another portion passes through the second mirror as an output wave. By adjusting the space between the first mirror and the second mirror it is possible to control the wavelengths of the output waves transmitted by the Fabry-Perot resonator.

In this manner, the first and the second mirror are configured to produce multiple transmitted rays delayed at even intervals. The first mirror channel 112 and the second mirror channel 114 provide support, respectively, for the first and the second optical elements. In an embodiment, the first and second mirror channels (112 and 114) are bonded, respectively, to the first and second mirrors to prevent dislodging as a result of vibration or external forces. In further embodiments, the first and second mirror channels (112 and 114) may be located on distal truncated edges, such as truncated edges 106, of the Fabry-Perot spacer 100.

In another embodiment, the first and the second mirror can further include a first and a second thermal stability ring, respectively. As used herein, a thermal stability ring can include any known shielding device configured to protect the externally facing surface of the first or second mirror from external thermal forces, such as temperature variations. Although various types of thermal stability rings may be employed, the stability rings of one embodiment can be formed from the same material as the Fabry-Perot spacer 100, such as ultra low expansion glass, Corning® ULE offered by Corning, Inc. of Corning, N.Y., single crystal silicon, ZERODUR® spacer material offered by Schott AG of Mainz, Germany, carbon fiber materials, material having a negative coefficient of thermal expansion, silicon carbide, crystalline silicon carbide, sapphire, quartz, electro-optical material, piezo-electric material, or ceramic material.

In various embodiments, the Fabry-Perot spacer 100 further includes an optical cavity 116 extended linearly through the center of the tetrahedral body between the first mirror channel 112 and the second mirror channel 114. The optical cavity 116 (otherwise referred to herein as "gap") provides an opening in the spacer 100 that allows the propagation of the ray of light between the two optical elements. In one embodiment, the optical cavity 116 has a length of one inch. However, different applications of a Fabry-Perot resonator may require different cavity lengths, such as one and a half or two inches. Therefore, the length of the optical cavity 116 in the Fabry-Perot spacer 100 can be modified according to the application. In further embodiments, the cavity 116 can have a substantially cylindrical shape.

As shown in the cross-sectional view of FIG. 3, various other embodiments of the Fabry-Perot spacer can include a first bore 118 and a second bore 120 extending orthogonally through the center of the tetrahedral body relative to each other and the optical cavity 116. Similar to the optical cavity 116, in various embodiments, the first bore 118 and the second bore 120 can be cylindrical in shape. In a further embodiment, the first and the second bore (118 and 120) can be configured to receive a vacuum system for creating a vacuum within the Fabry-Perot spacer 100. In other embodiments, the first and second bore (118 and 120) can be configured to receive a gas or liquid. In one embodiment, the first and the second bore (118 and 120) can each have a pair of mirror channels for receiving a second and a third pair of optical elements. As discussed herein, optical elements can include curved mirrors, and in particular, spherically curved mirrors. As such, in one embodiment, the Fabry-Perot spacer 100 has three channels extending orthogonal to each other through the center of the spacer (i.e., optical cavity 116, first bore 118, and second bore 120). Furthermore, the spacer 100 includes one optical element (e.g., curved mirror 122) at the end of each channel, for a total of six optical elements. Although shown as extending through the center of the Fabry-Perot spacer 100 substantially orthogonal to each other and the mirror channel, in varying embodiments the first and second bore can be routed off-axis of the center of the Fabry-Perot spacer 100.

Forces acting on the Fabry-Perot spacer 100 as a result of motional acceleration, harmonic motion, temperature, or mounting hardware can cause elastic deformation. As discussed above, elastic deformation can cause changes in the shape or length of the optical cavity 116. However, due to the reduced mass and symmetry of a tetrahedral shaped spacer 100 the mechanical resonance frequency of the spacer 100 is increased, resulting in the spacer 100 being substantially insensitive to accelerational forces, as well as deformation due to harmonic motion, temperature, or mounting hardware.

For example, using Finite Element Analysis the following table quantifies the improved insensitivity of a tetrahedral shape, as shown in an embodiment.

TABLE 1

Eigenfrequencies of a 1" and a 2" Tetrahedral and Cubic Spacer

| Cubic f | 2" f' | Q | Cubic f | 1" f' | Q |
|---|---|---|---|---|---|
| 18670 | 9.33 | 1000.536 | 38019 | 19 | 1000.5 |
| 18727 | 9.36 | 1000.374 | 38153 | 19 | 1004.026 |
| 19740 | 9.87 | 1000 | 40300 | 20.1 | 1002.488 |
| 22364 | 11.18 | 1000.179 | 45427 | 22.7 | 1000.595 |
| 23142 | 11.57 | 1000.086 | 47138 | 23.6 | 998.6864 |
| 23187 | 11.59 | 1000.112 | 47215 | 23.6 | 1000.318 |

| Tetrahedral f | 2" f' | Q | Tetrahedral f | 1" f' | Q |
|---|---|---|---|---|---|
| 20843 | 10.42 | 1000.144 | 55839 | 28 | 997.125 |
| 20913 | 10.45 | 1000.622 | 41969 | 21 | 999.2619 |
| 22088 | 11.04 | 1000.362 | 42103 | 21 | 1002.452 |
| 27235 | 13.61 | 1000.551 | 44429 | 22 | 1009.75 |
| 27670 | 13.84 | 999.6387 | 54753 | 27 | 1013.944 |
| 27743 | 13.87 | 1000.108 | 55674 | 28 | 994.1786 |

Table 1 shows a comparison of the first six mechanical resonance eigenmodes and the corresponding Q-factors (reflectivity of the optical elements) for the tetrahedral shape, compared with a cubic shaped spacer. As understood, eigenmodes represent the normal mode of vibration of an oscillating system. In particular, eigenfrequencies are the natural frequencies of vibration. Table 1 shows a comparison of both spacers with a cavity length of one inch and two inches. "f" represents the resonant frequency, "f'" represents the imaginary component of the resonant frequency, and "Q" represents the quality factor. While the quality factors remain substantially constant between the tetrahedral and cubic shapes, there is a substantial improvement of the resonant frequency. For example, the 2" tetrahedral shaped spacer demonstrates a first resonant frequency of 20843 Hz, while the 2" cubic shaped spacer demonstrates a first resonant frequency of 18670 Hz. As discussed herein, higher resonance frequencies increase the Fabry-Perot spacer's insensitivity to disruptive forces.

Figure 4A:
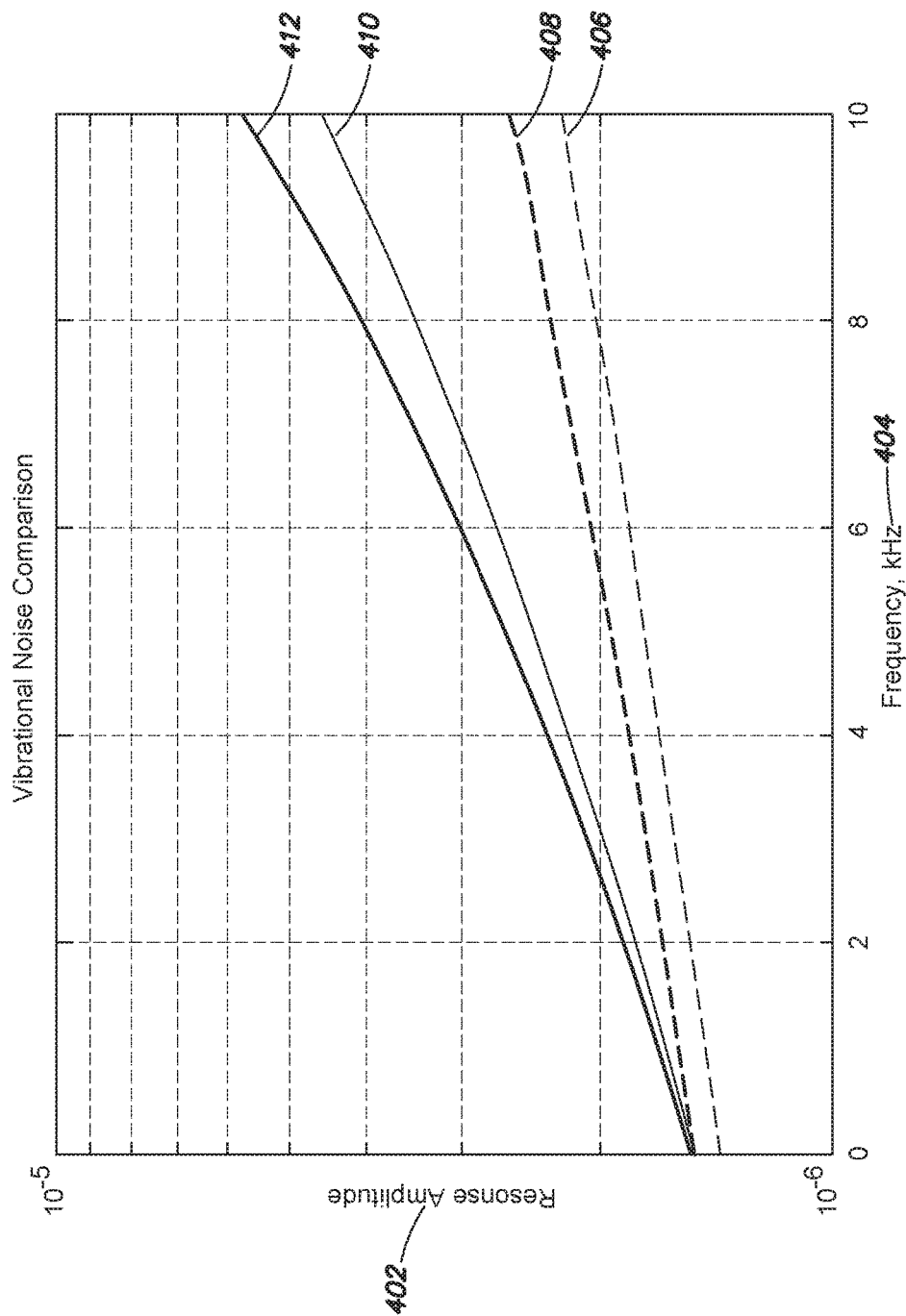
FIG. 4A is a graph demonstrating the force insensitivity of a Fabry-Perot resonator spacer according to an embodiment.
Figure 4B:
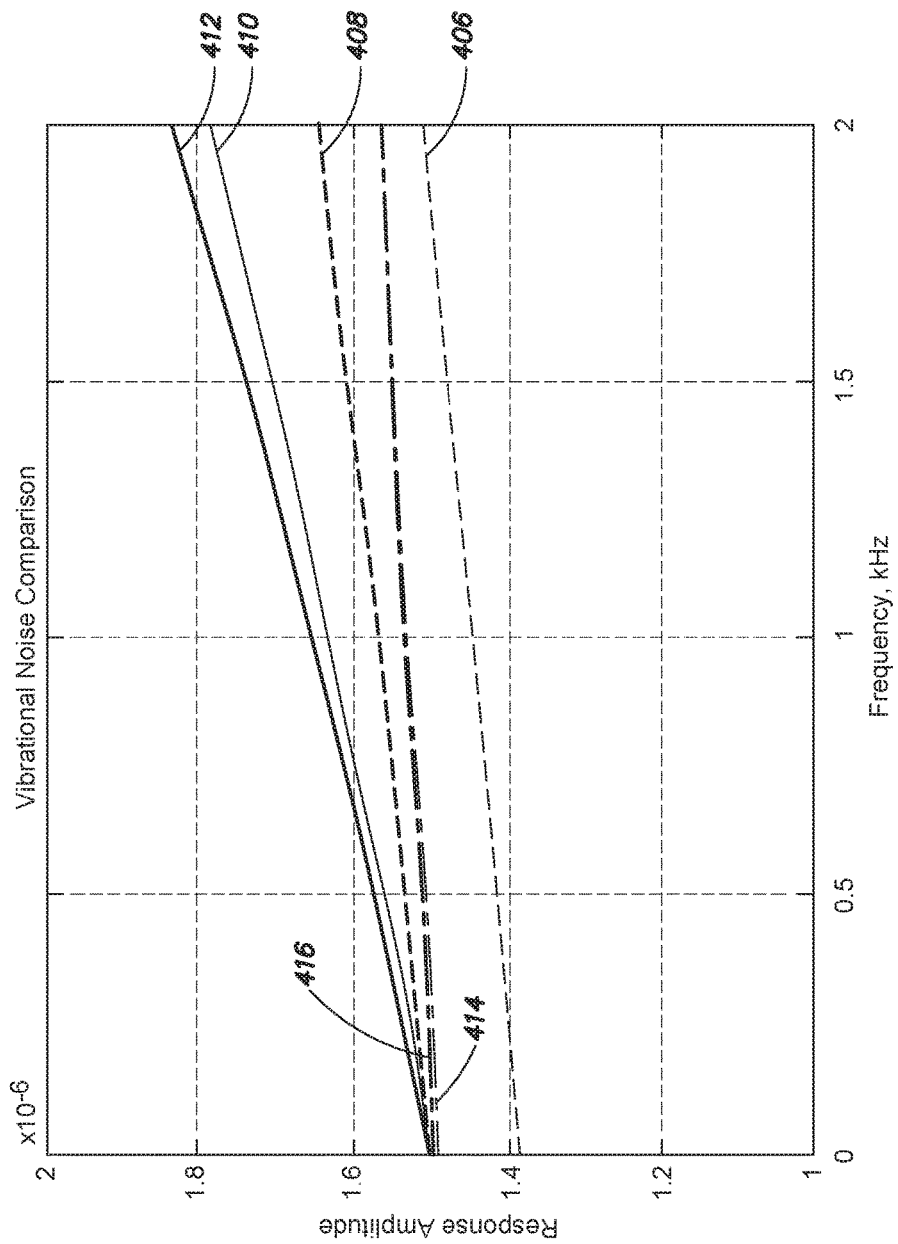
FIG. 4B is an enhanced view of FIG. 4A.

Turning now to FIGS. 4A and 4B, which show a visual representation of Table 1, the frequency response of a Fabry-Perot spacer having a tetrahedral shape is compared with a Fabry-Perot spacer having a cubic shape, in range of 0 to 10 kHz. In particular, FIG. 4A shows a 1" tetrahedral shape trace 406, a 1" cubic shape trace 408, a 2" tetrahedral shape trace 410, and a 2" cubic shape trace 412. FIG. 4A has a first axis 402 defining a response amplitude, and a second axis 404 defining a frequency in kHz. FIG. 4B shows an expanded view of FIG. 4A from 0-2 kHz including a 0.5" cubic shape trace 414 and a 0.5" tetrahedral shape trace 416. As shown in FIGS. 4A and 4B, the tetrahedral spacer shows improvements in both a one inch cavity length and a two inch cavity length. The response amplitude of both the one inch and two inch cavity tetrahedral spacers are lower than the cubic spacers at frequencies below 2 kHz. For example, at a frequency of 4200 Hz the 1" tetrahedral shaped spacer demonstrates a fractional length change response amplitude of 1.6 part per million, while the 1" cubic shaped spacer demonstrates a response amplitude of 1.4 part per million. In most applications, vibrational noise as a result of acceleration, for example on an aircraft, spacecraft, or boat, will be less than 2 kHz.

Accordingly, aspects and embodiments are directed to Fabry-Perot resonators. In particular, embodiments include resonator systems and spacers insensitive to deforming forces. One embodiment includes a resilient tetrahedral shaped Fabry-Perot spacer having characteristics of a spherical and cubic spacer, and is compatible with ring compensators. Reduced mass as well reduced symmetry of the spacer, due to the tetrahedral shape of the spacer, increases insensitivity to acceleration, vibration, and thermal forces across the frequency spectrum critical to airborne applications. In at least one embodiment, truncated corners and/or edges of the spacer further reduce the mass and the symmetry of the spacer, additionally increasing insensitivity of the resonator to disruptive forces. In other embodiments, the use of thermal stability rings protects externally facing surfaces of optical elements in the Fabry-Perot resonator, increasing insensitivity to thermal forces.

Additionally, the one or more embodiments as described herein may be executed conjunctively or adjunctively with additional embodiments. For example, while described in an embodiment as having a first thermal stability ring configured to shield the first optical element from temperature variations, in a separate embodiment, the Fabry-Perot resonator system 100 may include a first optical element susceptible to temperature variations. Indeed, various embodiments may be combined as necessary to conform to the demands of airborne applications.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A Fabry Perot resonator spacer, comprising:
   a tetrahedral body, the tetrahedral body being made of a material having a Poisson ratio and defining a plurality of triangular faces, a plurality of truncated edges, and a plurality of corners, wherein each one of the plurality of corners is truncated to form a mounting surface in a mounting plane, and wherein each one of the plurality of truncated edges is truncated according to $\varphi=\tan^{-1}(1-\upsilon)$, where $\varphi$ is the angle relative to one of the mounting planes and $\upsilon$ is the Poisson ratio of the material of the tetrahedral body;
   a first mirror channel configured to receive a first optical element;
   a second mirror channel configured to receive a second optical element; and
   an optical cavity extending linearly through the tetrahedral body between the first mirror channel and the second mirror channel.

2. The Fabry Perot resonator spacer of claim 1, wherein the first mirror channel and the second mirror channel are disposed on distal truncated edges of the tetrahedral body.

3. The Fabry Perot resonator spacer of claim 2, further comprising a first optical element disposed in the first mirror channel and a second optical element disposed in the second mirror channel.

4. The Fabry Perot resonator spacer of claim 3, wherein the first optical element includes a first curved mirror and the second optical element includes a second curved mirror.

5. The Fabry Perot resonator spacer of claim 4, wherein the first optical element further includes a first thermal stability ring and the second optical element further includes a second thermal stability ring, the first and the second thermal stability ring configured to shield the first and second optical elements from temperature variations.

6. The Fabry Perot resonator spacer of claim 5, further comprising a first and a second bore, the first and the second bore extending orthogonally through the tetrahedral body relative to each other and the optical cavity.

7. The Fabry Perot resonator spacer of claim 6, wherein the first and the second bore are cylindrical.

8. The Fabry Perot resonator spacer of claim 1, wherein the optical cavity has a length of one inch.

9. The Fabry Perot resonator spacer of claim 1, wherein the tetrahedral body is composed of one of ultra low expansion glass, single crystal silicon, carbon fiber materials, material having a negative coefficient of thermal expansion, silicon carbide, crystalline silicon carbide, sapphire, quartz, electro-optical material, piezo-electric material, and ceramic material.

10. A Fabry Perot resonator system, comprising:
    a spacer having a tetrahedral body, the tetrahedral body being made of a material having a Poisson ratio and defining a plurality of edges and a plurality of corners, each one of the plurality of corners being truncated to form a mounting surface in a mounting plane, and each one of the plurality of edges being truncated at a predetermined angle relative to one of the mounting planes, wherein each one of the plurality of edges is truncated according to $\varphi=\tan^{-1}(1-\upsilon)$, where $\varphi$ is the angle relative to the mounting plane and $\upsilon$ is the Poisson ratio of the material of the tetrahedral body;
    a first optical element and a second optical element spaced apart by the tetrahedral body; and
    an optical cavity extending linearly through the tetrahedral body between the first optical element and the second optical element.

11. The Fabry Perot resonator system of claim 10, wherein the first optical element and the second optical element are disposed on distal truncated edges of the tetrahedral body.

12. The Fabry Perot resonator system of claim 11, wherein the first optical element includes a first curved mirror and the second optical element includes a second curved mirror.

13. The Fabry Perot resonator system of claim 12, wherein the first optical element further includes a first thermal stability ring and the second optical element further includes a second thermal stability ring, the first and the second thermal stability ring configured to shield the first and second optical elements from temperature variations.

14. The Fabry Perot resonator system of claim 10, further comprising a first and a second bore, the first and the second bore extending orthogonally through the tetrahedral body relative to each other and the optical cavity.

15. The Fabry Perot resonator system of claim 10, wherein the optical cavity has a length of one inch.

\* \* \* \* \*